(12) United States Patent
Kushnirov

(10) Patent No.: US 12,349,758 B2
(45) Date of Patent: Jul. 8, 2025

(54) MAGNETIC FASTENING DEVICE

(71) Applicant: Cardo Systems, Ltd., Ra'anana (IL)

(72) Inventor: Avram Kushnirov, Barkan (IL)

(73) Assignee: Cardo Systems, Ltd., Ra'anana (IL)

( * ) Notice: Subject to any disclaimer, the term of this patent is extended or adjusted under 35 U.S.C. 154(b) by 0 days.

(21) Appl. No.: 19/051,778

(22) Filed: Feb. 12, 2025

(65) Prior Publication Data

US 2025/0176654 A1 Jun. 5, 2025

Related U.S. Application Data

(63) Continuation of application No. 18/891,226, filed on Sep. 20, 2024, which is a continuation of application No. 17/955,236, filed on Sep. 28, 2022, now Pat. No. 12,102,163, which is a continuation of application No. 17/675,425, filed on Feb. 18, 2022, now Pat. No. 11,484,086, which is a continuation of application No. PCT/IB2020/060404, filed on Nov. 5, 2020.

(51) Int. Cl.
*A42B 3/30* (2006.01)
*A42B 3/08* (2006.01)
*F16B 1/00* (2006.01)

(52) U.S. Cl.
CPC ............... *A42B 3/30* (2013.01); *A42B 3/08* (2013.01); *F16B 1/00* (2013.01); *F16B 2200/83* (2023.08)

(58) Field of Classification Search
CPC ..... A42B 3/30; A42B 3/08; F16B 1/00; F16B 2001/0035; F16B 2200/83
See application file for complete search history.

(56) References Cited

U.S. PATENT DOCUMENTS

| | | | |
|---|---|---|---|
| 4,521,831 | A | 6/1985 | Thayer |
| 5,914,816 | A | 6/1999 | Soto et al. |
| 6,457,838 | B1 | 10/2002 | Dugmore et al. |

(Continued)

FOREIGN PATENT DOCUMENTS

| | | |
|---|---|---|
| CN | 104853636 A | 8/2015 |
| CN | 106953657 A | 7/2017 |

(Continued)

OTHER PUBLICATIONS

Chinese Application No. Application No. 202411125616.1, Office Action, Mailed On Feb. 14, 2025, 19 pages.

(Continued)

*Primary Examiner* — Monica E Millner
(74) *Attorney, Agent, or Firm* — Kilpatrick Townsend & Stockton LLP

(57) ABSTRACT

A magnetic fastening device for releasably fastening a first unit and a second unit to each other. The first unit has a first unit abutment surface. The second unit having a second unit abutment surface. The first unit abutment surface and the second unit abutment surface are adapted for abutment against each other. The device includes at least one pair of magnets including first magnet allocated to the first abutment surface and a second magnet allocated to the second abutment surface. The first magnet and the second magnet exert an attractive force to each other. The first unit may be or include a communication device and the second unit is a helmet or a separate unit permanently fixed to a helmet.

20 Claims, 2 Drawing Sheets

(56) References Cited

U.S. PATENT DOCUMENTS

Figure 1:
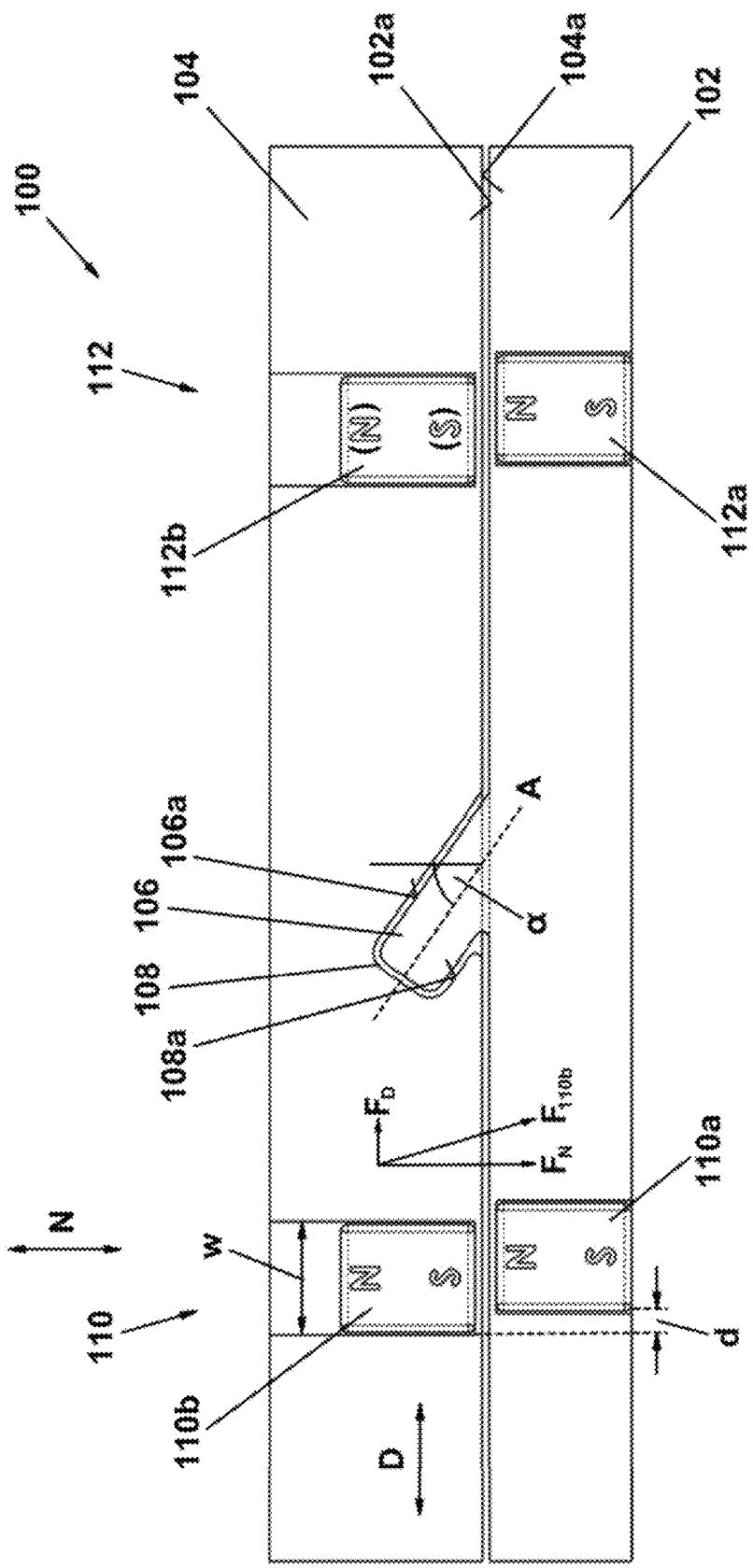

| | | | | |
|---|---|---|---|---|
| 6,751,810 | B1* | 6/2004 | Prendergast | G02B 23/125 |
| | | | | 403/321 |
| 7,264,368 | B2* | 9/2007 | Sherring | A42B 3/04 |
| | | | | 362/105 |
| 8,056,152 | B2 | 11/2011 | Brace | |
| 8,371,707 | B2 | 2/2013 | Uzar | |
| 8,908,389 | B2* | 12/2014 | Teetzel | F41H 1/04 |
| | | | | 2/205 |
| 9,507,245 | B1 | 11/2016 | Druker et al. | |
| 9,756,930 | B2 | 9/2017 | Hanchett et al. | |
| 9,829,772 | B2* | 11/2017 | Harrison | G03B 17/561 |
| 10,021,931 | B2 | 7/2018 | Tulley | |
| 10,028,543 | B2 | 7/2018 | Munns | |
| 10,271,601 | B2 | 4/2019 | Chang | |
| 10,492,559 | B1 | 12/2019 | Kele et al. | |
| 11,129,431 | B2 | 9/2021 | Whitesell et al. | |
| 11,484,086 | B2 | 11/2022 | Kushnirov | |
| 12,102,163 | B2 | 10/2024 | Kushnirov | |
| 2006/0133068 | A1 | 6/2006 | Sherring | |
| 2006/0150304 | A1* | 7/2006 | Bentz | A42B 3/08 |
| | | | | 2/421 |
| 2011/0145981 | A1 | 6/2011 | Teetzel et al. | |
| 2012/0002046 | A1 | 1/2012 | Rapoport et al. | |
| 2012/0320569 | A1 | 12/2012 | Lu | |
| 2014/0020159 | A1 | 1/2014 | Teetzel et al. | |
| 2014/0173811 | A1 | 6/2014 | Finiel et al. | |
| 2014/0245523 | A1* | 9/2014 | Teetzel | G02B 23/125 |
| | | | | 2/422 |
| 2015/0286117 | A1 | 10/2015 | Sung et al. | |
| 2015/0338659 | A1 | 11/2015 | Gallery et al. | |
| 2017/0059967 | A1 | 3/2017 | Harrison et al. | |
| 2017/0341871 | A1 | 11/2017 | Peters | |
| 2020/0170329 | A1* | 6/2020 | Bohn | A42B 3/221 |
| 2020/0383417 | A1 | 12/2020 | Bohn et al. | |
| 2022/0057173 | A1 | 2/2022 | Jacobson | |

FOREIGN PATENT DOCUMENTS

| | | |
|---|---|---|
| CN | 110892591 A | 3/2020 |
| JP | 2020037760 A | 3/2020 |

OTHER PUBLICATIONS

Japanese Application No. 2023-527094, Office Action, Mailed On Feb. 4, 2025, 8 pages.
U.S. Appl. No. 17/675,425, "Corrected Notice of Allowability", Aug. 2, 2022, 4 pages.
U.S. Appl. No. 17/675,425, "Corrected Notice of Allowability", Jul. 15, 2022, 2 pages.
U.S. Appl. No. 17/675,425, "Notice of Allowance", Jun. 29, 2022, 8 pages.
U.S. Appl. No. 17/955,236, "Final Office Action", Jan. 23, 2024, 14 pages.
U.S. Appl. No. 17/955,236, "Final Office Action", Mar. 20, 2023, 13 pages.
U.S. Appl. No. 17/955,236, "Non-Final Office Action", Dec. 6, 2022, 9 pages.
U.S. Appl. No. 17/955,236, "Non-Final Office Action", Jul. 10, 2023, 14 pages.
U.S. Appl. No. 17/955,236, "Notice of Allowance", Aug. 14, 2024, 9 pages.
International Application No. PCT/IB2020/060404, "International Search Report and Written Opinion", Jul. 12, 2021, 12 pages.
European Application No. 23157694.3, Office Action mailed on Apr. 1, 2025, 5 pages.

* cited by examiner

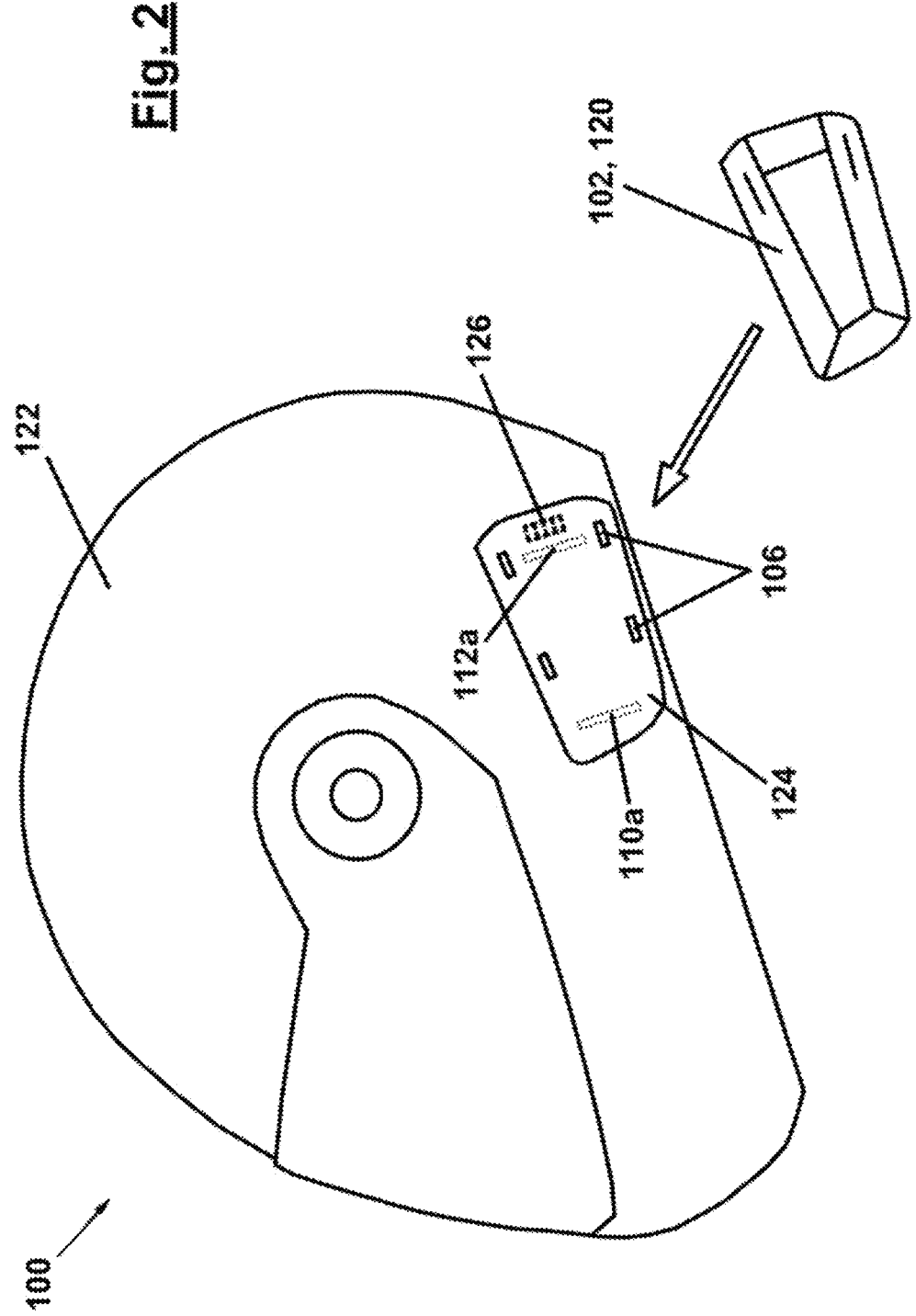

MAGNETIC FASTENING DEVICE

CROSS REFERENCE TO RELATED APPLICATIONS

This application is a continuation of U.S. patent application Ser. No. 18/891,226 entitled "Magnetic Fastening Device", filed Sep. 20, 2024, which is a continuation application of U.S. patent application Ser. No. 17/955,236 entitled "Magnetic Fastening Device", filed Sep. 28, 2022, now U.S. Pat. No. 12,102,163, issued Oct. 1, 2024, which is a continuation application of U.S. patent application Ser. No. 17/675,425 entitled "Magnetic Fastening Device", filed Feb. 18, 2022, now U.S. Pat. No. 11,484,086, issued Nov. 1, 2022, which is a continuation of PCT/IB2020/060404, filed on Nov. 5, 2020, which are herein incorporated by reference in their entireties for all purposes.

DESCRIPTION

The invention relates to a magnetic fastening device for releasably fastening a first unit and a second unit to each other, said first unit having a first unit abutment surface, and said second unit having a second unit abutment surface, said first unit abutment surface and said second unit abutment surface being adapted for abutment against each other, and said magnetic fastening device further comprising at least one pair of magnets, a first magnet of said pair of magnets being allocated to the first abutment surface, and a second magnet of said pair of magnets being allocated to the second abutment surface, said first magnet and said second magnet exerting an attractive force to each other.

Magnetic fastening devices of the afore-mentioned type are, for example, known from magnetic whiteboards. In this case, papers or foils may be fastened to a board (constituting the first unit) made from ferromagnetic material, e.g. a ferritic steel sheet, forming the actual whiteboard by using fastening elements (constituting the second unit) comprising permanent magnets. In this case, the first unit abutment surface and the second unit abutment surface are sandwiching the paper or foil between them when abutting against each other.

With this arrangement, on the one side, the papers or foils may easily be fastened to the whiteboard. On the other side, this type of magnetic fastening is susceptible to disturbance by external forces, in particular external forces exceeding the attractive magnetic forces acting between the magnets of the at least one pair of magnets.

In view of the above, it is the object of the present invention to further improve magnetic fastening devices of the afore-mentioned type.

According to the present invention, this object is solved by a magnetic fastening device of the afore-mentioned type, in which a first abutment surface of said first unit abutment surface and said second unit abutment surface is provided with at least one protrusion, in which a second abutment surface of said first unit abutment surface and said second unit abutment surface is provided with at least one recess, said at least one recess being adapted to receive said at least one protrusion, and in which said first magnet and said second magnet are displaced relative to each other by a displacement distance in a displacement direction extending parallel to the extension of said first abutment surface and said second abutment surface at the location of said protrusion and said recess such that, in a state in which said first abutment surface abuts against said second abutment surface and said at least one protrusion is received in said at least one recess, a component of said attractive force extending parallel to said first abutment surface and said second abutment surface maintains said at least one protrusion in said at least one recess.

According to the present invention, the magnetic fastening force is supplemented by a form fit between the at least one protrusion and the at least one recess. Preferably, the at least one protrusion and the at least one recess positively mate with each other when said first abutment surface and said second abutment surface abut against each other. As a consequence, if the magnetic fastening force of the at least one pair of magnets should be exceeded by an external force, the first and second units nevertheless remain fastened to each other due to the form fit. In addition, the magnetic fastening device according to the present invention provides for a synergistic effect between the magnetic fastening and the form fit fastening, as the attractive force between the first and second magnets maintains the form fit, in other words holds said at least one protrusion in said at least one recess.

In order to be able to provide for a mechanically stable connection, i.e. a connection substantially without play, it is further suggested that said at least one protrusion has a protrusion abutment surface, and said at least one recess has a recess abutment surface, and that said component of said attractive force pulls said protrusion abutment surface against said recess abutment surface.

According to a preferred embodiment, the at least one protrusion has the shape of a pin, a longitudinal axis of said pin extending obliquely with respect to said first abutment surface. Preferably, said longitudinal axis may enclose with a normal direction of said first abutment surface an angle different from 0°, preferably amounting to between about 30° and about 60°, more preferably amounting to about 45°. If the external forces have a main direction from which they are exerted on the fastening device, the longitudinal axis may be generally inclined towards or away from this main direction depending on which of the first and second units it is provided. In this way, the external forces may contribute to maintaining the form fit between the at least one protrusion and the at least one recess.

In order to provide a sufficiently strong attractive force between the magnets, it is advantageous that the displacement distance amounts to less than a width of at least one of said first magnet and said second magnet determined parallel to said displacement direction, preferably less than half of said width. This arrangement guarantees that the two magnets at least partially face each other.

Furthermore, at least one of the magnets, preferably both magnets, of the at least one pair of magnets may be arranged inside the corresponding first unit and/or the corresponding second unit and in close vicinity of the corresponding first unit abutment surface or second unit abutment surface, respectively. For aesthetical reasons, however, the at least one magnet may be covered by a thin layer of the material constituting a housing of the first unit and second unit, respectively.

Sufficiently strong magnetic forces may be achieved, for example, if at least one magnet of said pair of magnets is an active magnet, e.g. a permanent magnet or an electromagnet. Active magnets, in contrast to passive magnets, emit a magnetic field even when not being influenced by an external magnetic field.

According to an embodiment, a rear earth magnet, preferably a Samarium-Cobalt magnet, more preferably a Neodym-Samarium-Cobalt magnet may, for example, be used as a permanent magnet.

Although it is preferred, in particular in view of the strength of the magnetic forces, to have two active magnets, in particular two permanent magnets, it might be conceivable, in particular in order to reduce the costs of the magnetic fastening device, that one magnet of said pair of magnets is constituted by a passive magnet, e.g. an element at least partially made from a ferromagnetic or ferrimagnetic material and magnetized by the respective other magnet of said pair of magnets. Passive magnets, e.g. elements made from ferromagnetic or ferrimagnetic material, emit a magnetic field only when being magnetized by an active magnet.

A major advantage of the fastening device according to the present invention, resides in the fact that it is free of moving parts. As a consequence, for example, the first unit may be released from the second unit by simply gripping and removing it from the second unit in a direction extending oppositely to the engagement direction of the form fit. In particular in contrast to fastening devices involving a snap-lock connection, there is no need for depressing a tab and holding it depressed while removing the first unit from the second unit which considerably facilitates the releasing process.

According to a specific embodiment, said second unit may be constituted by a helmet, in particular motorcycle helmet, or a separate unit permanently fixed to said helmet. Many types of helmets, in particular protective helmets, are used across many different industries and sports. Among the most commonly used protective helmets are motorcycle helmets.

According to a further embodiment of the present invention, said first unit may include a functional device, for example a communication device, in particular a communication device using Bluetooth® technology. Such communication devices are well known in the art. The applicant is well-known as a manufacturer of such communication devices.

If it is required to establish an electrical connection between the functional unit and functional components of the helmet, e.g. microphones and/or loudspeakers, at least one electrical contact may be provided on at least one protrusion and in its corresponding recess. It is, however, also conceivable to provide at least one separate electrical connector at the first unit and the second unit.

In order to allow easy access to the functional device, it may preferably be disposed at a side surface of the helmet. In other words, said first abutment surface and said second abutment surface preferably may extend substantially parallel to a side surface of said helmet.

In this specific arrangement, the external forces jeopardizing the fastening of the first and second units mainly are forces caused by a forward movement of the wearer of the helmet, e.g. wind forces caused by a motorcycle ride or slapping forces caused by twigs of bushes and/or trees. As mentioned before, external forces having a main direction may be used for maintaining the form fit between the at least one protrusion and the at least one recess. Therefore, it is further suggested for a helmet, in particular a motorcycle helmet, that said displacement direction extends towards a front portion or a rear portion of said helmet depending on whether the protrusion is allocated to the helmet or the functional unit.

In addition to the form-fit of the at least one protrusion and the at least one recess, the magnetic fastening device according to the present invention may include at least one further mechanical locking unit, for example a turn and release locking unit and/or a lift and release locking unit and/or a safety catch locking unit and/or a latch type locking unit and/or a snap-lock unit including a catch, a trap and a release mechanism, e.g. a release button, for overriding the locking effect of catch and trap. In this context, the magnetic forces of the at least one pair of magnets helps avoiding detachment of the first unit from the second unit by mistake, in particular if the user unintentionally presses the release button of the further mechanical locking unit. This allows a two- or more-step release mechanism.

In the following, the invention will be described in more detail with respect to a specific embodiment referring to the enclosed drawings, in which:

FIG. 1 shows a cross-sectional view of a magnetic fastening device according to the invention; and FIG. 2 shows a perspective view of a motorcycle helmet having a communication device attached thereto using a magnetic fastening device according to the invention.

In FIG. 1 a magnetic fastening device is generally designated by reference numeral 100.

The magnetic fastening device 100 comprises a first unit 102 having a first unit abutment surface 102a and a second unit 104 having a second unit abutment surface 104a. In the fastened state of the magnetic fastening device 100 shown in FIG. 1, the first unit abutment surface 102a and the second unit abutment surface 104a are abutting against each other.

Furthermore, the first unit 102 comprises a protrusion 106 protruding from the first unit abutment surface 102a and, in the fastened state of the magnetic fastening device 100 shown in FIG. 1, engaging into a mating recess 108 provided in the second unit abutment surface 104a. Although FIG. 1 shows a small distance between a protrusion abutment surface 106a of the protrusion 106 and a recess abutment surface 108a of the recess 108, the protrusion 106 preferably tightly fits into the recess 108.

In the embodiment shown in FIG. 1, the protrusion 106 has the shape of a pin, the longitudinal axis A of which extends obliquely from said first abutment surface 102a, enclosing with a normal direction N extending orthogonal to the first unit abutment surface 102a and the second unit abutment surface 104a an angle α different from 0°. In the embodiment shown in FIG. 1, the angle α amounts to about 45°.

In the embodiment shown in FIG. 1, the magnetic fastening device 100 further comprises two pairs 110 and 112 of magnets 110a, 110b and 112a, 112b. A first magnet 110a, 112a of each pair 110, 112 is allocated to the first unit 102 while a second magnet 110b, 112b of each pair 110, 112 is allocated to the second unit 104. The first magnets 110a, 112a are located in close vicinity of the first unit abutment surface 102a, while the second magnets 110b, 112b are located in close vicinity of the second unit abutment surface 104a. Furthermore, the magnetic poles "N" and "S" of the magnets 110a, 110b and 112a, 112b of each pair 110, 112 are oriented in such a way that the magnets exert an attractive magnetic force onto each other.

As may be seen from FIG. 1, corresponding magnets 110a, 110b and 112a, 112b, when seen in normal direction N, are not in perfect alignment with each other. Rather, the respective first magnet 110a, 112a is displaced relative to the corresponding second magnet 110b, 112b by a displacement distance d in a displacement direction D extending parallel to the extension of said first abutment surface 102a and said second abutment surface 104a. As a consequence, a component FD of said attractive force (exemplarily shown for magnet 110b: attractive force F110b) extending parallel to the displacement direction D maintains the protrusion 106 and recess 108 in engagement with each other.

As the displacement of the magnets 110a, 110b and 112a, 112b reduces the overall attractive force acting in normal direction N, the displacement distance d amounts to less the width w of the magnets.

Although in the embodiment of FIG. 1, the magnets 110a, 110b of the first pair 110 both are permanent magnets, i.e. active magnets, it is to be noted that it is also conceivable that one of the magnets may be a passive magnet, i.e. a magnet having a magnetic field only due to being magnetized by an active magnet. In FIG. 1, this is indicated for magnet 112b of the second pair 112, by putting the signs "N" and "S" for the magnetic poles in brackets.

One major advantage of the magnetic fastening device 100 according to the present invention is that it is free of any moving parts.

As may be seen from FIG. 2, the magnetic fastening device 100 according to the present invention may be used, for example, for fastening a communication unit 120, e.g. a Bluetooth® communication unit, to a motorcycle helmet 122, either indirectly using a tray 124 mounted at the helmet 122 or directly (not shown).

In this case, the communication device 120 is an element of the first unit 102. Furthermore, the helmet 122 (in the case of direct fastening to the helmet 122) or the tray 124 (in the case of indirect fastening) constitute or are part of the second unit 104 of the magnetic fastening device 100.

As may be seen from FIG. 2, the communication device 120 is fastened to a side surface 122a of the helmet 122, preferably in such a way that the wind forces exerted by the driving wind during a motorcycle ride support the maintenance of the form fit between protrusion 106 and recess 108.

In the embodiment of FIG. 2, the magnetic fastening device 100 includes four protrusions 106 and two magnets 110a, 112a (shown in dotted lines as covered by the plastics material of the tray 124). The corresponding recesses and other magnets are not shown in FIG. 2 as they are located at the lower side of the communication device 120. However, it should be noted that the afore-mentioned numbers are by no means intended to limit the scope of protection, and that a different number of protrusions and/or a different number of pairs of magnets may be used as well. Furthermore, the locations of the protrusions and/or magnets shown in FIG. 2 are merely intended as examples, but by no means limiting the scope of protection.

As a further option, an electric connector 126 intended for connecting at least one microphone (not shown) and at least one loudspeaker (not shown) implemented in the helmet 122 to the communication device 120 may be provided on the tray 124. As the connector 126 is merely an option, it is shown in dashed lines in FIG. 2.

Finally, it should be mentioned, that the tray 124 may be fixed to the helmet 122 by a clamp (not shown) which may permanently or releasably be fixed to the tray 124. It is, however, also conceivable to glue the tray 124 to the helmet 122, e.g. by using a strong double-sided tape.

With respect to the afore-given discussion of a specific embodiment of the invention, it is to be noted that neither the drawings nor the description thereof are intended to limit the scope of protection. For example, the protrusion may assume any suitable shape, e.g. the form of a thin and roundish pin or a rectangular protrusion or any other shape, as long as it fits into the recess.

The invention claimed is:

1. A communication device assembly for a helmet, comprising:
   a communication device comprising a communication device abutment surface, a plurality of magnets allocated to the communication device, and a recess, wherein the recess comprises a first electrical contact;
   a receiving structure configured to be mounted to a side of a helmet, wherein the receiving structure comprises a receiving structure abutment surface, a plurality of magnets allocated to the receiving structure, and a protrusion, wherein the protrusion comprises a second electrical contact;
   wherein the communication device abutment surface and the receiving structure abutment surface are adapted for abutment against each other and the protrusion is received in the recess when the communication device is mounted to the receiving structure;
   wherein magnetic force is exerted between magnets allocated to the communication device and corresponding magnets allocated to the receiving structure when the communication device is mounted to the receiving structure; and
   wherein the recess and the protrusion are shaped to provide a form fit fastening between the recess and the protrusion when the communication device is mounted to the receiving structure.

2. The communication device assembly of claim 1, wherein an electrical connection is established between the first electrical contact and the second electrical contact when the communication device is mounted to the receiving structure and the protrusion is within the recess.

3. The communication device assembly of claim 1, wherein the protrusion is electrically connected to at least one functional component in the helmet.

4. The communication device assembly of claim 3, wherein the at least one functional component comprises at least one of a microphone or a loudspeaker.

5. The communication device assembly of claim 1, wherein the protrusion has a protrusion abutment surface and the recess has a recess abutment surface; and
   wherein magnetic force exerted between magnets allocated to the communication device and magnets allocated to the receiving structure pulls the protrusion abutment surface against the recess abutment surface.

6. The communication device assembly of claim 1, wherein at least one of the magnets allocated to the communication device or at least one of the magnets allocated to the receiving structure comprises an active magnet.

7. The communication device assembly of claim 1, wherein at least one of the magnets allocated to the communication device or at least one of the magnets allocated to the receiving structure comprises a passive magnet.

8. The communication device assembly of claim 1, wherein the plurality of magnets allocated to the communication device comprises at least two pairs of magnets; and
   wherein the plurality of magnets allocated to the receiving structure comprises at least two corresponding pairs of magnets.

9. The communication device assembly of claim 1, wherein the helmet comprises a motorcycle helmet.

10. The communication device assembly of claim 1, wherein the communication device comprises a Bluetooth® communication device.

11. A communication device assembly for a helmet, comprising:
   a communication device comprising a communication device abutment surface, a plurality of magnets allocated to the communication device, and a recess;
   a receiving structure configured to be mounted to a side of a helmet, wherein the receiving structure comprises a receiving structure abutment surface, a plurality of magnets allocated to the receiving structure, and a protrusion;

wherein, when the communication device is mounted to the receiving structure, the communication device abutment surface and the receiving structure abutment surface are adapted for abutment against each other and the protrusion is configured to be received in the recess;

wherein magnetic force is exerted between magnets allocated to the communication device and corresponding magnets allocated to the receiving structure when the communication device is mounted to the receiving structure; and wherein the magnets allocated to the communication device and the corresponding magnets allocated to the receiving structure are arranged such that (i) magnetic force acting in a direction normal to the communication device abutment surface and the receiving structure abutment surface maintains the abutment of the communication device abutment surface against the receiving structure abutment surface, and (ii) magnetic force extending parallel to the communication device abutment surface and the receiving structure abutment surface maintains the protrusion in the recess.

12. The communication device assembly of claim 11, wherein the recess has a recess abutment surface and the protrusion has a protrusion abutment surface; and wherein the magnetic force extending parallel to the communication device abutment surface and the receiving structure abutment surface pulls said protrusion abutment surface against said recess abutment surface to maintain the protrusion in the recess.

13. The communication device assembly of claim 11, wherein the recess comprises a first electrical contact and the protrusion comprises a second electrical contact; and wherein an electrical connection is established between the first electrical contact and the second electrical contact when the protrusion is within the recess.

14. The communication device assembly of claim 13, wherein the protrusion is electrically connected to at least one functional component in the helmet.

15. The communication device assembly of claim 14, wherein the at least one functional component comprises at least one of a microphone or a loudspeaker.

16. The communication device assembly of claim 11, wherein at least one of the magnets allocated to the communication device or at least one of the magnets allocated to the receiving structure comprises an active magnet.

17. The communication device assembly of claim 11, wherein at least one of the magnets allocated to the communication device or at least one of the magnets allocated to the receiving structure comprises a passive magnet.

18. The communication device assembly of claim 11, wherein the plurality of magnets allocated to the communication device comprises at least three pairs of magnets; and wherein the plurality of magnets allocated to the receiving structure comprises at least three corresponding pairs of magnets.

19. The communication device assembly of claim 11, wherein the helmet comprises a motorcycle helmet.

20. The communication device assembly of claim 11, wherein the communication device comprises a Bluetooth® communication device.

* * * * *